H. C. SCHAPER.
WEIGHING SCALE.
APPLICATION FILED FEB. 17, 1916.
1,237,706.
Patented Aug. 21, 1917.
2 SHEETS—SHEET 1.
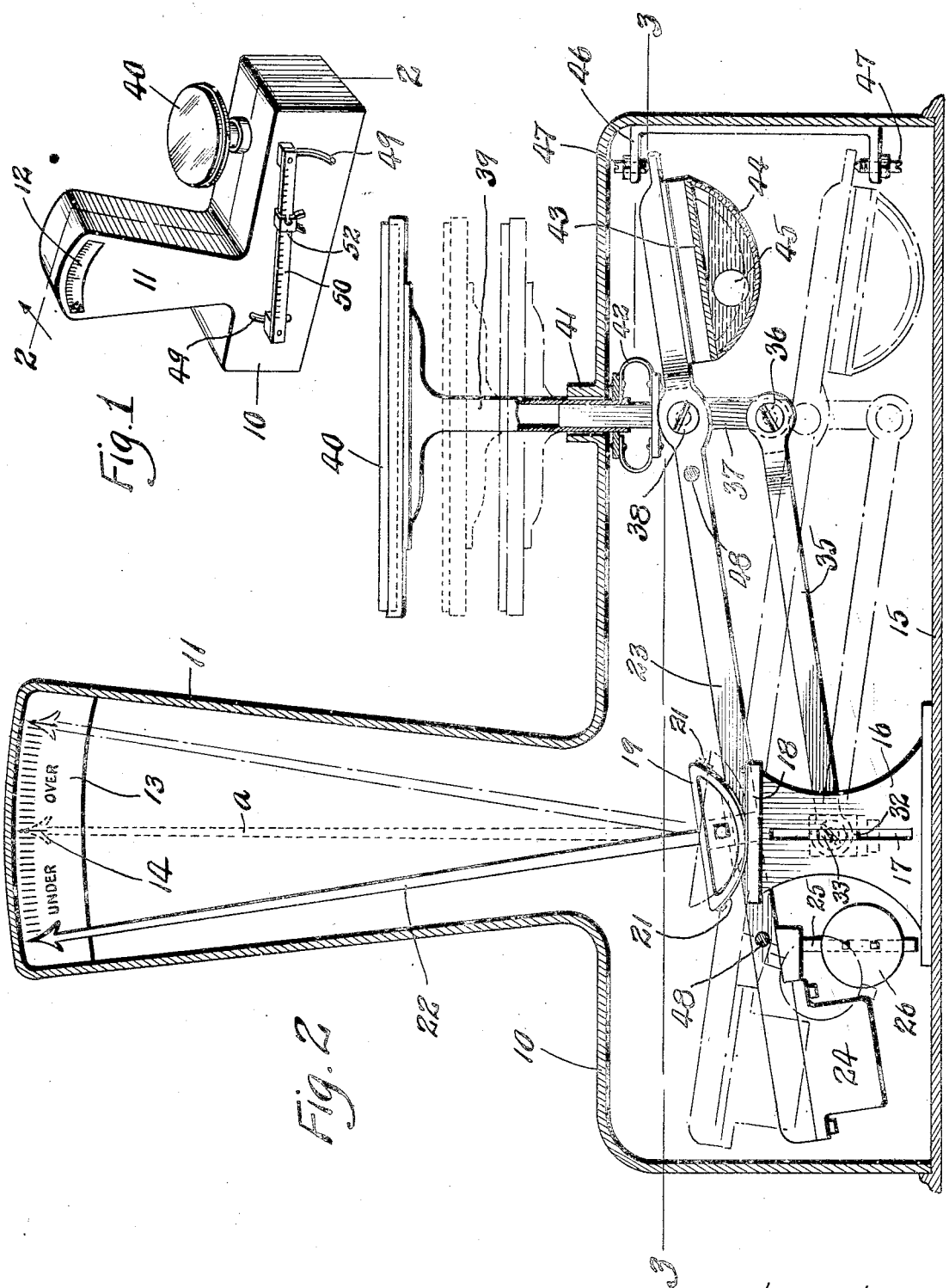
Inventor
Henry C. Schaper

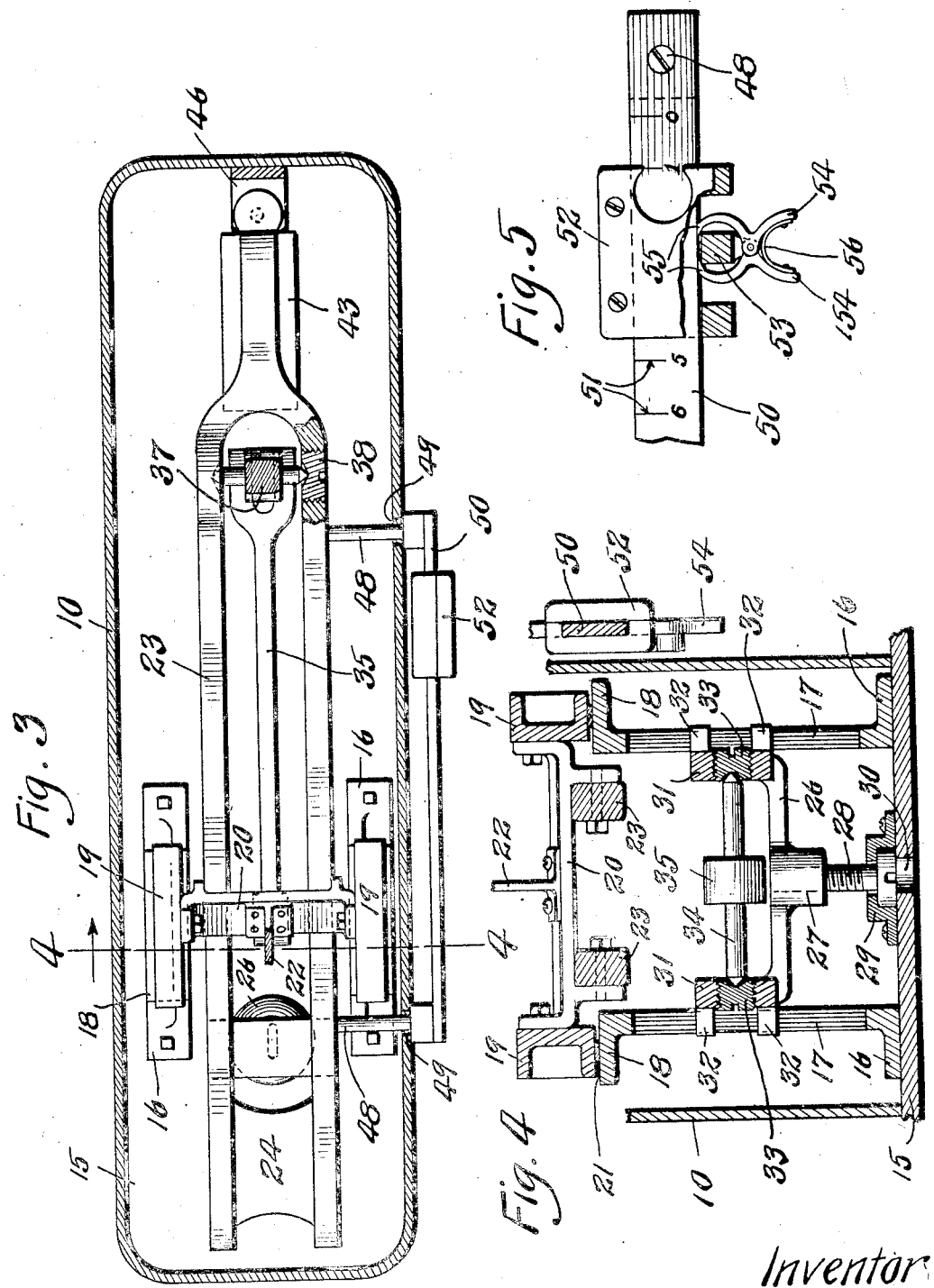

UNITED STATES PATENT OFFICE.

HENRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHING-SCALE.

1,237,706.　　　Specification of Letters Patent.　　Patented Aug. 21, 1917.

Application filed February 17, 1916. Serial No. 78,918.

*To all whom it may concern:*

Be it known that I, HENRY C. SCHAPER, a citizen of the United States, residing at St. Louis, Missouri, have invented a certain new and useful Improvement in Weighing-Scales, of which the following is a full, clear, and exact description, such as will enable others skilled in the art to which it appertains to make and use the same, reference being had to the accompanying drawings, forming part of this specification.

My invention relates to a weighing scale of the automatic type and which is particularly designed for weighing loads of predetermined weight.

The principal objects of my invention are, to provide a comparatively simple, accurate and positively operating scale mechanism which is entirely devoid of knife-edged bearings and which mechanism includes a main lever having a rolling fulcrum preferably supported on a horizontal plane; further, to provide a scale wherein the load is supported by point and cup bearings, resisted by a counter-balance and pendulum weight, and indicated by a pointer traveling over a graduated scale; to provide in an automatic scale a combined compensating device and stabilizer which acts automatically to compensate for a change of leverage caused by the rolling fulcrum of the main lever and to eliminate vibration of the moving parts during operation; to construct the load supporting member in two parts and interpose between said parts springs which serve to absorb shocks resulting from loads thrown or dropped onto the load supporting platform or plate; to provide a readily accessible adjustable support or fulcrum for the secondary lever which coöperates with the main lever in forming the parallelogram of the scale, and to provide a readily adjustable self-locking poise on the graduated beam of the scale.

With the foregoing and other objects in view, my invention consists in certain novel features of construction and arrangement of parts, hereinafter more fully described, claimed and illustrated in the accompanying drawings, in which—

Figure 1 is a perspective view of a scale of my improved construction.

Fig. 2 is an enlarged vertical section taken approximately on the line 2—2 of Fig. 1.

Fig. 3 is a horizontal section taken approximately on the line 3—3 of Fig. 2.

Fig. 4 is an enlarged cross section taken approximately on the line 4—4 of Fig. 3.

Fig. 5 is an elevational view of a portion of the graduated beam and the adjustable poise thereon, parts of the latter being in section to more clearly illustrate the poise locking device.

Referring by numerals to the accompanying drawings, 10 designates a substantially rectangular housing which contains the greater portion of the operating mechanism of my improved scale, and formed integral with or fixed to said housing and extending upward near one end thereof is a housing 11.

Formed in the front wall of this housing 11 is an arcuate opening 12 which is closed by a section of glass or other transparent material and immediately opposite this opening within said housing is a plate 13 on the face of which appears an arcuate row of graduated marks, the central one 14 of which is of such size or color as to be clearly distinguished from the others.

Immediately beneath the marks to the left of said central mark appears the word "Under" and beneath the marks to the right of said central mark appears the word "Over."

The housing 10 is preferably removably mounted on a base plate 15 and positioned on said plate immediately beneath the housing 11 is a pair of upright supports 16 which are vertically slotted as designated by 17 and provided at their upper ends with horizontally disposed plates 18 having smooth flat top surfaces.

Arranged for rocking movement on top of the plates 18 are arcuate members 19, the same being connected by a cross piece 20.

In order to maintain these rocking members in proper position upon the plates 18 and to insure uniformity of movement, a thin flexible metal strip 21 is secured at one end to each rocking member and the opposite end of said strip being secured to the corresponding plate 18. It will be understood that these flexible metal strips are positioned between the curved underfaces of the arcuate members and the flat top surfaces of plates 18 and thus said rocking members are maintained in proper operative position on said plates 18 and all tendency to move laterally during rocking movement is eliminated.

Fixed to cross piece 20 is the lower end of an arm or pointer 22 which extends upwardly within housing 11 and the upper end of said pointer terminates immediately in front of plate 13 on which the graduated scale heretofore described appears.

Fixed in any suitable manner to cross piece 20 are parallel legs or members which constitute the main lever 23 of the scale and carried by the left hand end of this lever is a counter-balancing weight 24. Depending from said lever between the weight 24 and cross piece 20 is a rod 25 on which is adjustably positioned a pendulum weight 26.

Postioned between the uprights 16 is a cross piece 26', the center of which is provided with a bearing 27 which receives the threaded end of a vertically positioned adjusting screw 28, the head of which latter is positioned within a housing 29, the same being fixed to base plate 15. Formed in this base plate immediately beneath the head of said adjusting screw is an aperture 30 through which a screw-driver or like device may be introduced for the purpose of turning said adjusting screw.

The ends of cross piece 26' are provided with blocks 31 having outwardly projecting vertically disposed ribs or flanges 32, the same being arranged for sliding movement in the slots 17 in plates 16. Adjustably positioned in blocks 31 are cups 33 and positioned therein are the points on the ends of a transversely positioned pivot pin or rod 34. Fixed to this rod or pin is the left hand end of the secondary lever 35, the same occupying a position a short distance below and parallel with main lever 23. Pivotally connected to the right hand end of this secondary lever by point and cup bearings 36 is the lower end of an upright member 37, the same being pivotally connected to main lever 23 by point and cup bearings 38. This member 37 extends a short distance above main lever 33 and loosely mounted thereupon is a tubular post 39, the upper end of which carries a load receiving plate or platform 40.

Post 39 is loosely mounted in a bearing 41, which latter is formed in the top of housing 10. Interposed between the lower end of post 39 and member 37 are springs 42, the same serving to yieldingly resist and absorb shocks resulting from loads thrown or dropped onto platform 40.

Main lever 23 extends a short distance to the right of the point where it is pivotally connected to upright member 37 and carried by said extension is the combined compensating device and stabilizer forming a part of my invention. This device comprises a housing 43 having a curved bottom wall 44 and arranged for rolling movement upon suitable guides on said bottom wall is a spherical or cylindrical member 45. The space within this housing is filled or partially filled with a comparatively heavy liquid, such as oil, glycerin, or the like, and thus the rolling movement of member 45 within said housing will be impeded and comparatively slow.

Projecting inwardly from the right hand wall of housing 10 at points near the top and bottom of said housing are brackets 46 in which are positioned vertically disposed adjusting screws 47, the same being located in the path of travel of the extreme right hand end of the main lever 23. These set screws form adjustable stops for limiting the vertical swinging movement of the main lever.

Seated in main lever 23 are horizontally disposed pins 48 which project outward through arcuate slots 49 which are formed in the front wall of housing 10 and fixed to the outer ends of said pins are the ends of a beam 50, the front face of which is provided with graduated scale marks 51, the same reading from right to left.

Arranged for sliding movement on this graduated beam is a poise 52, the weight of which is such that when it is located at the zero point on the graduated scale of beam 50, said scale is balanced with the pointer 22 occupying a true vertical position as illustrated in dotted lines a, Fig. 2 and with the end of said pointer directly over the central mark 14 of the graduated scale on plate 13. Whenever this poise is moved toward the left hand along beam 50, the various movable parts of the scale mechanism will assume the positions illustrated by solid lines in Fig. 2.

Formed integral with the underside of poise 52 is a block 53 to the underside of which is pivotally connected a pair of fingers 54. The upper ends of these fingers are shaped so as to form comparatively small wedges 55, which are adapted to engage between the top of block 53 and the underside of beam 50.

A spring 56 is interposed between the lower ends of fingers 54 and tends to normally move the upper ends of said fingers toward each other and to maintain the wedges 55 in position between block 53 and beam 50, thereby locking the poise to said beam in its adjusted position.

The operation of my improved scale is as follows:

Assuming that it is desired to weigh loads of one pound each, the operator releases the poise latch by moving the lower ends of fingers 54 toward each other against the resistance offered by springs 56, thus withdrawing wedges 55 from locking position and the poise 52 is now moved toward the right hand along beam 19, until it is located on the sixteen ounce mark on said beam, after which fingers 54 are released, thereby permitting the wedges 55 to reëngage between block 53 and the underside of beam 50, which action locks said poise in its adjusted position.

The positive locking of the poise to the graduated beam of the scale is a highly important and very desirable feature in scales of the type to which my invention pertains and particularly such scales as are used in weighing a large number of loads of predetermined weight.

The commodity to be weighed is now applied to platform 40, but by reason of the position of the poise 52 on beam 50 and the relation of the weight of said poise to the weights 24 and 26, the operating parts of the scale will not be actuated until more than fifteen ounces of the commodity have been placed on platform 40. Thus, when the weight of the load placed on platform 40 exceeds fifteen ounces, the parts of the scale will be actuated and pointer 20 will start to move toward the right hand and toward central mark 14 on plate 13. The graduated marks on plate 13 to the left of center mark 14 represents graduations of an ounce, and consequently after the pointer 22 starts to move toward center mark 14, the operator can continue to add to the platform a comparatively small amount of the commodity and when the end of the pointer occupies a position immediately over central mark 14, the operator understands that the predetermined amount of weight, namely, one pound, occupies the platform 40. Obviously, if the pointer goes beyond the central mark 14, it will be necessary to remove a comparatively small amount of the commodity to permit the parts to act so that the end of the pointer will move back to said central mark.

It will be understood that springs 42 perform the functions of a shock absorber to yieldingly resist and absorb any sudden downward movement of platform 40, and tubular post 39, as a result of weight being suddenly dropped or thrown onto said platform, and consequently such shocks will not be transmitted to those parts of the weighing mechanism below the shock absorber.

During the movements of the parts of the weighing mechanism, members 19 rock upon the plates 18 and as heretofore stated, they are held in proper operative positions by the thin resilient strips 21.

The levers 23 and 35 maintain parallel positions and the point and cup bearings 33, 36, and 38 permit said levers to move freely and with little or practically no friction. The movement of the weight 45 within the housing 43 compensates for the change of leverage due to the rocking action of the members 19 upon the plates 18 during the weighing operations and said weight 45 traveling through the body of comparatively heavy liquid acts as a stabilizer to bring about a comparatively slow even movement of the parts and in effect eliminating vibration and jerking movements.

The arc of movement of lever 23 is limited by set screws 47 and the vertical position of the fixed bearing for secondary lever 35 is regulated by means of the adjusting screw 28.

During weighing operations or while main lever 23 swings vertically the members 37 and 39 which support the platform 40 are shifted slightly out of a true vertical position owing to the shifting action of the fulcrum for said main lever, but this movement of parts 37 and 39 is insufficient to effect the proper operation of the scale. Necessarily to accommodate this slight movement of parts 37 and 39 bearing 41 is made slightly larger than the external diameter of member 39.

A scale of my improved construction is comparatively simple, is entirely devoid of knife-edge bearings, which, it will be understood wear rapidly and develop friction, can be easily and quickly adjusted, operates positively without undue vibration and is especially applicable for use where it is desired to weigh a large number of loads of predetermined weight.

It will be readily understood that minor changes in the size, form and construction of the various parts of my improved scale can be made and substituted for those herein shown and described, without departing from the spirit of my invention, the scope of which is set forth in the appended claims.

I claim:

1. In a scale of the class described, the combination of a pair of substantially parallel levers, one of which has a rolling fulcrum and the other an adjustable fulcrum, a load carrying member having pivotal connection with both levers, a beam carried by the lever having the rolling fulcrum, and a poise adjustably positioned on said beam.

2. In a scale of the class described, a main lever having a rolling fulcrum, a secondary lever having an adjustable fulcrum, a load carrying member having pivotal connection with both levers, which load carrying member is formed in two parts, and a shock absorber interposed between said parts.

3. In a scale of the class described, a main lever having a rolling fulcrum, a secondary lever having an adjustable fulcrum, a load carrying member having pivotal connection with both levers, and a combined compensating device and stabilizer carried by said main lever.

4. In a scale of the class described, the combination of a pair of substantially parallel levers, one of which has a rolling fulcrum and the other an adjustable fulcrum, a load carrying member having pivotal connection with both levers, a beam carried by the lever having the rolling fulcrum, a poise adjustably positioned on said beam, a counterbalancing member carried by the lever having the rolling fulcrum, and a pointer fixed to said last mentioned lever.

5. In a scale of the class described, a main lever having a rolling fulcrum, a secondary lever having an adjustable fulcrum, a load carrying member having pivotal connection with both levers, a beam carried by said main lever, a poise adjustably positioned on said beam, and means for locking said poise to said beam.

6. In a scale of the class described, a main lever having a rolling fulcrum, a secondary lever having an adjustable fulcrum, a load carrying member having pivotal connection with both levers, a counter-balancing weight on one end of the main lever, and a combined compensating device and stabilizer on the other end of said lever.

7. In a scale of the class described, a main lever having a rolling fulcrum, a secondary lever having an adjustable fulcrum, a load carrying member having pivotal connection with both levers, a counter-balancing weight on one end of the main lever, a combined compensating device and stabilizer on the other end of said lever, and adjustable means for limiting the movement of said main lever.

8. In a scale of the class described, a main lever having a rolling fulcrum, a secondary lever having an adjustable fulcrum, a load carrying member having pivoted connection with both levers, a counterbalancing weight carried by one end of said main lever, a pendulum weight carried by said main lever, and a combined compensating device and stabilizer on the opposite end from the counter-balancing weight.

9. In a scale of the class described, a main lever having a rolling fulcrum, an adjustable member below the rolling fulcrum of said main lever, a secondary lever pivotally connected to said adjustable member, a load carrying member, and cup and point bearings between said load carrying member and the levers.

10. In a scale of the class described, a pair of supports, members arranged for rocking movement upon said supports, a lever connected to said rocking members, a secondary lever having an adjustable fulcrum, a load carrying member having pivotal connection with both of said levers, a pointer carried by the main lever, a counterbalancing weight on one end of said main lever, and a combined compensating device and stabilizer on the other end.

11. In a scale of the class described, a pair of supports, members arranged for rocking movement upon said supports, a lever connected to said rocking members, a secondary lever having an adjustable fulcrum, a load carrying member having pivotal connection with both of said levers, a pointer carried by the main lever, a counterbalancing weight on one end of said main lever, a combined compensating device and stabilizer on the other end, a beam carried by said main lever, and an adjustable poise on said beam.

12. In a scale of the class described, the combination with a main lever, of a stabilizer associated therewith, which stabilizer comprises a housing having a curved bottom wall, a weight loosely mounted for rolling movement on said bottom wall, and a body of comparatively heavy liquid within said housing.

13. In a scale of the class described, a pair of supports, members positioned for rocking movement thereupon, flexible connections between said supports and the rocking members for retaining the latter in proper operative position upon the supports, a main lever connected to said rocking members, a load carrying member pivotally connected to said main lever, and a secondary lever pivotally connected to said load carrying member and having an adjustable fulcrum.

14. In a scale of the class described, a pair of supports, members positioned for rocking movement thereupon, flexible connections between said supports and the rocking members for retaining the latter in proper operative position upon the supports, a main lever connected to said rocking members, a load carrying member pivotally connected to said main lever, a secondary lever pivotally connected to said load carrying member and having an adjustable fulcrum, a graduated beam associated with the main lever, and an adjustable poise on said beam.

15. In a scale of the class described, a pair of levers, one of which has a rolling fulcrum and the other an adjustable fulcrum, an upright member pivotally connected to said levers, a load carrying member loosely mounted on the upper portion of said upright member, and springs interposed between said upright member and load carrying member.

16. In a scale of the class described, the combination of a main lever, of a stabilizer associated therewith, which stabilizer comprises a housing containing a body of comparatively heavy liquid, a curved track in said housing, and a weight loosely mounted for rolling movement on said curved track which weight is submerged in the liquid within the housing.

In testimony whereof I hereunto affix my signature in the presence of two witnesses, this 8th day of February, 1916.

HENRY C. SCHAPER.

Witnesses:
M. P. SMITH,
M. A. HANDEL.